United States Patent [19]
Wilheim et al.

[11] 3,721,640
[45] March 20, 1973

[54] CROSSLINKABLE COATING AGENTS

[75] Inventors: Hans Wilheim, 6700 Ludwigshafen; Klaus Gulbins; Heinrich Hartmann, both of 6703 Limburgerhof, all of Germany

[73] Assignee: Badische Anilin & Soda-Fabrik Aktiengesellschaft, Ludwigslafen am Rhine, Germany

[22] Filed: Dec. 3, 1970

[21] Appl. No.: 94,986

Related U.S. Application Data

[63] Continuation-in-part of Ser. No. 686,754, Nov. 29, 1967, abandoned.

[30] Foreign Application Priority Data

Dec. 3, 1966 Germany............P 16 69 078.1

[52] U.S. Cl...260/31.2 N, 260/33.2 R, 260/33.6 UB, 260/881
[51] Int. Cl...............................................C08f 45/34
[58] Field of Search.................260/33.6, 881, 876

[56] References Cited

UNITED STATES PATENTS

| | | | |
|---|---|---|---|
| 3,317,635 | 5/1967 | Osmond | 260/881 |
| 3,397,166 | 8/1968 | Schmidle | 260/881 |
| 3,373,221 | 3/1968 | May | 260/837 R |

*Primary Examiner*—Theodore Morris
*Attorney*—Johnston, Root, O'Keeffe, Keil, Thompson & Shurtleff

[57] ABSTRACT

Crosslinkable coating agents based on an organic dispersion (I) of a crosslinkable copolymer (A) which dispersion is stable without an emulsifier and a diisocyanate or polyisocyanate (II). The organic dispersion (I) of the copolymer (A) is prepared by the copolymerization of:

a. polymerizable compounds containing hydroxyl groups, with
b. other comonomers in
c. an organic liquid in which the copolymer (A) formed is not soluble, and in the presence of (B) a copolymer of comonomers from groups (a) and (b) and which is soluble in the organic liquid (c).

16 Claims, No Drawings

CROSSLINKABLE COATING AGENTS

This application is a continuation-in-part of U.S. application Ser. No. 686,754, filed Nov. 29, 1967, now abandoned.

The present invention relates to crosslinkable agents for coating and impregnating materials of all types, particularly textile materials, the said coating agents being based on organic dispersions of certain crosslinkable copolymers and diisocyanates or polyisocyanates as crosslinking agents.

Coating agents of organic solutions of crosslinkable copolymers and diisocyanates or polyisocyanates are generally known. These agents have a number of disadvantages because of their high viscosity. While organic dispersions do not have this disadvantage, it has not hitherto been possible to prepare dispersions which will satisfy very high requirements as regards fastness to water and solvents of the coatings prepared therefrom because this fastness is always unfavorably affected by the necessary emulsifiers which remain in the coatings.

We have now found coating agents which do not have the said disadvantages and which contain:

I. a dispersion of a crosslinkable copolymer (A) prepared in conventional manner by free radical copolymerization of:
   a. a polymerizable olefinically unsaturated compound containing a hydroxyl group with
   b. another comonomer in
   c. an organic liquid in which the copolymer (A) is insoluble and which does not contain any active hydrogen atoms, in the presence of (B) a copolymer of comonomers of groups (a) and (b) which is soluble in the organic liquid (c), and
II. a diisocyanate or polyisocyanate.

Examples of comonomers (a) which are suitable as copolymerization components in the dispersions (I) are polymerizable alcohols, such as allyl alcohol, N-methylol compounds and monoethanolamides and diethanolamides of acrylamide and methacrylamide, and particularly partial esters of acrylic acid, methacrylic acid and maleic acid with polyhydric aliphatic alcohols containing two to eight carbon atoms such as ethylene glycol, 1,2-propanediol, 1,3-propanediol, 1,4-butanediol, glycerol, trimethylolpropane and pentaerythritol.

The expression "partial ester" is intended to describe an ester in which not all of the —OH groups of the polyhydric alcohol are esterified. Therefore a partial ester within this meaning is an ester having free, unesterfied —OH groups on the radical of the polyhydric alcohol.

Particularly suitable comonomers (b) are the compounds conventionally used industrially in the synthesis of polymeric coating agents, such as butadiene, styrene, vinyl chloride, vinylidene chloride, acrylonitrile and methacrylonitrile and preferably $C_1$ to $C_{12}$ alkyl esters of acrylic acid, methacrylic acid and maleic acid and vinyl esters of $C_2$ to $C_{24}$ alkylcarboxylic acids. By choosing specific comonomers (b) it is possible to influence the solubility of the copolymers prepared from them in the liquid (c). Thus, the insolubility of the copolymer (A) in the liquid (c) is achieved by using for the production of the copolymer (A) monomers (b) comprising at least 60 percent by weight— with reference to the total amount of monomers (b) — of $C_1$ to $C_3$ alkyl esters of acrylic acid and/or methacrylic acid or of a mixture of one or more of these esters with at most the same weight of styrene, acrylonitrile or a mixture of these two compounds. The remaining portion of comonomers (b) i.e. at most 40 percent of the total weight of monomers (b) used in the production of (A), may be chosen at will from the above mentioned groups. For chemical modification of the copolymers, for example in order to impart thereto an anionic character or a cationic character (the methods for which are generally known), about 10 percent (by weight as throughout this specification) of the amount of (b) of an ionic or potentially ionic copolymer (b') may be used, for example acrylic acid, methacrylic acid, maleic acid, maleic anhydride, acrylamide, methacrylamide, N-vinylimidazole and N-vinylimidazolium methyl sulfate.

The organic liquid (c) should be such that the copolymer (A) formed is insoluble therein at a temperature of 20° C or at any rate only soluble to such an extent that the liquid phase of the dispersion is not appreciably more viscous than the pure liquid because otherwise the advantages of the dispersion are lost. The expression "not appreciably more viscous" is intended to mean that the viscosity, measured at 20° C does not rise to more than double the viscosity value of the pure liquid (c). The viscosity is preferably measured by means of a capillary viscosimeter. The liquid should not contain any active hydrogen atoms. Small amounts of soluble constituents, for example up to 10 percent of the total amount of the polymer, are not as a rule detrimental. It is not difficult to determine by preliminary experiment whether or not an organic liquid is suitable as regards the condition of insolubility or sparing solubility of the polymer. As a general rule, sparing solubility in organic liquids can be brought about by ionic comonomers (for example those of group (b')) or by strongly polar comonomers such as acrylonitrile or methacrylonitrile.

Thus there is a wide choice between aliphatic hydrocarbons such as octane and ligroin, cycloaliphatic hydrocarbons such as cyclohexane and perhydronaphthalene, aromatic hydrocarbons such as benzene, toluene, the xylenes and terpenes and aliphatic ketones and ethers and esters having up to about 12 carbon atoms. Chlorinated hydrocarbons such as ethylene chloride, cyclic ethers such as tetrahydrofuran and dioxane, dimethylsulfoxide, dimethylformamide and acetonitrile are also suitable. Which of these liquids is preferred therefore depends on the particular application, e.g. the volatility and flashpoint required. The following groups of liquids are of particular technical importance: aliphatic hydrocarbons, cycloaliphatic hydrocarbons and aromatic hydrocarbons.

The virtually free choice of organic liquid is attributable to a considerably extent to the fact that copolymers (B) are used in the production of the dispersions. The comonomers (a) are characteristic components of these copolymers; the other comonomers may be the compounds specified under (b). The choice of the two comonomers is governed by the requirement that (B) has to be soluble in (c), and can be easily made, if necessary after some conventional preliminary experiments. The expression "soluble in (c)" is intended to mean that the copolymer (B) gives a clear solution in the liquid (c) at 20° C in the concentration to be used, i.e. in a concentration of at least 0.5 percent by weight, preferably 1.5 to 20 percent by weight with reference to the total weight of (B) and (c). This requirement can be fulfilled by using for the production of the copolymer (B) monomers (b) which comprise at least 60 percent by weight of $C_4$ to $C_{12}$ alkyl esters of acrylic acid and/or methacrylic acid. The remaining portion of comonomers (b), i.e. at most 40 percent of the total weight of monomers (b) used in the production of (B), may be chosen at will from the abovementioned groups.

It is particularly advantageous to use copolymers (A) having K-values of from 30 to 100, preferably 30 to 60, and copolymers (B) having K-values of from 15 to 30, preferably 15 to 25. The K-value is widely used in industry as a measure of the degree of polymerization of high polymers. The K-values indicated above as well as those indicated in the Examples were determined according to H. Fikentscher, Cellulose-Chemie, vol. 13 (1932), pages 58 to 64 and 71 to 74, using 2 percent solutions of the polymers in dimethyl formamide at 20° C, where $K = k \cdot 10^3$.

The desired K-value can be easily achieved in conventional manner by choosing the appropriate amount of free-radical forming substances. A guide for this choice is the well-known rule that, with a given mixture of monomers, the smaller the amount of free-radical forming substances, the higher the K-value of the polymer.

Suitable diisocyanates or polyisocyanates (II) are aliphatic, cycloaliphatic, araliphatic and aromatic compounds of this type, for example the divalent and trivalent isocyanates of the paraffin series having two to 18 carbon atoms, toluylene diisocyanate and triisocyanate, diphenylmethane-4,4'-diisocyanate and diphenylpropane-(2,2)-4,4'-diisocyanate. Diisocyanates are generally preferred.

The following approximate values (given as percentages by weight) for the relative proportions of the components in the copolymer dispersion are found to be suitable, but are not critical:

comonomer (a) : 2 to 40 percent, preferably 5 to 35 percent;

comonomer (b) : 98 to 60 percent, preferably 95 to 75 percent;

(in each case with reference to the total amount of the comonomers (a) and (b) contained in (A);

comonomer (a) in (B) : 2 to 50 percent, preferably 5 to 30 percent, with reference to the amount of (B).

The amount of (B) may be about 3 to 100 percent, preferably 5 to 30 percent, of the amount of the copolymer (A). The mixture of the copolymer (A) and the copolymer (B) should together form in the finished dispersion (I) a solids content of 20 to 70 percent, preferably 30 to 65 percent, with reference to the total amount of the dispersion.

It is therefore preferred to use from 60 to 400 percent of the organic liquid (c) with reference to the comonomers (a) and (b). In special cases however it is possible to decrease the amount of (c) to 45 percent or to increase it to 1000 percent with reference to (a) and (b).

The amount of (II) should be from about 2 to 30 percent, preferably from 5 to 12 percent, of solids content of (I) (I = 100 percent).

Furthermore it is possible to start from mixtures of different comonomers (a) and/or (b) for preparing copolymer (A). This is also true of copolymer (B) and also of (II) and particularly of the organic liquid (c), whose solubility properties may be substantially varied in this way.

The copolymerization for the production of (I) may be carried out in known manner with stirring, for example by placing the bulk of the liquid (c) together with the copolymer (B) dissolved therein in a container and allowing the mixture of comonomers (a) and (b) to flow in at 25° to 100° C at a rate commensurate with the progress of the copolymerization.

Substances forming free radicals, such as benzoyl peroxide, cumene peroxide, lauroyl peroxide, perbenzoic acid and azoisobutyronitrile may be used as polymerization initiators in amounts of 0.01 to 5 percent with reference to the total amount of comonomers (a) and (b).

The copolymer (B) dissolves in (c), and (B) has a dispersing effect on the copolymer (A) formed. The use of other dispersing agents is not necessary and this constitutes a considerable advantage of the invention.

In the production of the copolymer (B), too, conventional methods may be used. Thus, for example, it is possible to dissolved the comonomers (a) and (b) in an inert solvent or mixture of solvents, e.g. in a mixture of xylene and ethyl acetate, and to add to the solution a free-radical forming substance, such as may be used for the production of (A). Polymerization may then be initiated by heating a portion of this solution under reflux, whereupon the remaining portion of the solution may be gradually added to the reaction mixture at a temperature of from 50° to 130° C at the same rate at which the polymerization proceeds. If necessary, the polymerization may be completed by adding further amounts of free-radical forming substance.

The finished dispersions (I) and consequently the mixtures according to this invention are in general compatible with assistants and additives of all types, for example with leveling agents, anti-corrosives, matting agents, crosslinking catalysts and pigments. Solid additives usually require the use of a dispersing agent.

Suitable crosslinking catalysts are particularly basic compounds such as tertiary amines in amounts of about 0.1 to 2 percent with reference to (II).

The coating agents are outstandingly suitable for finishing textiles, paper and leather, as paints for wood, metals, glass, ceramics and concrete, and also as binders, for example for the production of bonded nonwoven fabrics and laminated articles.

After the agents according to this invention have been applied to the substrate they are crosslinked either alone by way of the isocyanate groups and hydroxyl groups contained therein or this process is accelerated in conventional manner by heating to about 60° to 160° C and/or by means of a catalyst. When the copolymer (B), which until then acts as a dispersing agent, is crosslinked, it is incorporated into the macromolecular network with the result that the dispersing agent properties of (B) are lost. This has a very advantageous effect on the durability of the coating which is extremely resistant to the action of solvents of all types.

Coating agents according to this invention may be used together with other, preferably hydrophobic, agents, for example silicone resins, if coatings are desired which are particularly resistant to boiling water.

The invention is illustrated by the following examples in which parts and percentages are by weight.

EXAMPLE 1

A mixture of the following composition is prepared:
I. 1000 parts of a copolymer (A) having a K-value of 35 of
  a. 60 parts of butanediol monoacrylate and
  b. 510 parts of ethyl acrylate, 330 parts of methyl acrylate and 100 parts of acrylonitrile prepared by a conventional method under nitrogen at 85° C in about 5 hours by copolymerization using 45 parts of azoisobutyronitrile in
  c. 3600 parts of gasoline (boiling range 80° to 140° C) and in the presence of 380 parts of 64.7 percent solution of a copolymer (B) of 10 percent of butanediol monoacrylate and 90 percent of 2-ethylhexyl acrylate in a mixture (5:2) of xylene and ethyl acetate, and
II. 135 parts of 2,4-toluylene diisocyanate.

The solution of the copolymer (B) has been prepared as follows:
  100 parts of butanediol monoacrylate and
  900 parts of 2-ethylhexyl acrylate are dissolved in
  540 parts of a mixture of xylene and ethyl acetate in a weight ratio of 5:2.
  10 parts of azoisobutyronitrile is added to the solution.

300 parts of this mixture is heated under nitrogen to 95° C in a 4-neck flask provided with a thermometer, reflux condenser and dropping funnel. As soon as the polymerization reaction has been initiated, the remainder of the mixture is added at 95° C in the course of 1 hour while stirring. Two hours after the end of the addition another 5 parts of azoisobutyronitrile is added to the reaction mixture in order to complete the polymerization, stirring being continued for 3 hours.

There is obtained a clear solution having a solids content of 64.7 percent of polymer (B). The polymer (B) has a K-value of 17.

A nylon 6 cloth having a weight of 50 g/sq.m. is coated with the said mixture to a thickness of 15 g/sq.m. and heated for 5 minutes at 90° C.

A cloth is obtained which has a soft and flexible handle and is outstandingly resistant to solvents.

EXAMPLE 2

100 parts of a mixture (for the preparation of copolymer (A)) consisting of
  16 parts of propyleneglycol monoacrylate,
  20 parts of acrylonitrile,
  70 parts of methyl acrylate,
  94 parts of ethyl acrylate,
  300 parts of gasoline (boiling range 80°C to 140°C) and
  4.5 parts of azoisobutyronitrile
504.5 parts is added at 85°C under nitrogen while stirring to a mixture consisting of
  38 parts of the 64.7 percent copolymer (B) solution described in Example 1 and
  25 parts of gasoline (boiling range 80° to 140°C).

The whole is heated to 85°C. After polymerization has set in, the remaining 404.5 parts of the mixture is added at 85° to 90°C in the course of 2 hours while stirring. After 6 hours polymerization is over. A dispersion of a copolymer (A) having a solids content of 38.5 percent is obtained. The copolymer (A) has a K-value of 35.

100 parts of this 39.5 percent dispersion is blended with a mixture of 2.04 parts of toluylene diisocyanate and 2.4 parts of hexamethylene diisocyanate.

The coating agent thus obtained is applied at the rate of 15 g/sq.m. (based on the solids content) to a polyester/cotton union cloth, and the cloth is dried at 95°C for 5 minutes. The cloth thus coated is distinguished by very good adherence of the coating and a soft handle.

EXAMPLE 3

The procedure of Example 2, paragraph 1, is followed except that the mixture for the preparation of the copolymer (A) has the following composition:
  12 parts of butanediol monoacrylate,
  10 parts of styrene
  70 parts of methyl methacrylate,
  106 parts of methyl acrylate,
  2 parts of acrylic acid,
  300 parts of gasoline, and
  2.5 parts of azoisobutyronitrile.

There is obtained a 40 percent dispersion of a copolymer (A) having a K-value of 45. 100 parts of this dispersion is mixed with 4.25 parts of toluylene diisocyanate and the resultant coating agent is applied at the rate of 15 g/sq.m. (based on the solids content) to a nylon 6 cloth. After heating at 100° C for 5 minutes a coating is obtained which has a soft handle, adheres very well to the cloth and is extremely resistant to the solvents used in dry cleaning.

The same agent can be applied to sheet steel. After baking at 100° C for 20 minutes a coating is obtained which adheres very well and is highly elastic.

EXAMPLE 4

The procedure of Example 2, paragraph 1, is followed except that the mixture for the preparation of copolymer (A) consists of
  10 parts of ethyleneglycol monoacrylate,
  15 parts of styrene,
  70 parts of methyl methacrylate,
  90 parts of ethyl acrylate,
  15 parts of n-butyl acrylate,
  300 parts of gasoline and
  1.5 parts of azoisobutyronitrile,
whereas the copolymer (B), which is used as a 65 percent solution in a mixture of xylene and ethyl acetate (5:2), comprises
  10 parts of ethyleneglycol monoacrylate,
  45 parts of n-butyl acrylate and
  45 parts of decyl acrylate,
  7.5 parts of azoisobutyronitrile being used for the main polymerization and 4 parts of azoisobutyronitrile for completion of the polymerization, and has a K-value of 20.

A 40.5 percent dispersion of a copolymer (A) having a K-value of 50 is obtained.

100 parts of this dispersion is mixed with 3.94 parts of toluylene diisocyanate and the resulting agent is applied to a fabric as described in Example 2. A coating is obtained which adheres very well and has good resistance to the solvents used in dry cleaning.

EXAMPLE 5

The procedure of Example 2, paragraph 1, is followed using the solution of copolymer (B) described therein. However, the mixture for preparing copolymer (A) comprises 4 parts of methylolacrylamide,
8 parts of butanediol monoacrylate,
30 parts of acrylonitrile,
25 parts of styrene,
30 parts of n-butyl acrylate,
103 parts of ethyl acrylate,
300 parts of gasoline and
4.5 parts of azoisobutyronitrile.

There is obtained a 40 percent dispersion of a copolymer (A) having a K-value of 35.

100 parts of this dispersion is mixed with 3.9 parts of toluylene diisocyanate. The agent thus obtained is applied to nylon 6 cloth as described in Example 1. There is obtained a coating which is resistant to trichloroethylene and adheres very well to the cloth. The coated cloth is distinguished by a soft handle.

We claim:

1. A crosslinkable coating agent for coating and impregnating materials of all types, particularly textile materials, and based on an organic dispersion of a crosslinkable copolymer and a polyisocyanate as a crosslinking agent, which coating agent contains the following components:
  I. a dispersion of (A) a crosslinkable copolymer which has been prepared by free radical copolymerization of (a) a polymerizable olefinically unsaturated compound selected from the group consisting of allyl alcohol, N-methylol acrylamide, N-methylol methacrylamide, N-monoethanolacrylamide, N-monoethanol methacrylamide, N-diethanol acrylamide and N-diethanol methacrylamide and partial esters of a' acrylic acid, methacrylic acid and maleic acid and (b') polyhydric aliphatic alcohols containing two to eight carbon atoms, and (b) at least one other comonomer selected from the group consisting of butadiene, styrene, vinyl chloride, vinylidene chloride, acrylonitrile, methacrylonitrile, $C_1$ to $C_{12}$ alkyl esters of acrylic acid, methacrylic acid and maleic acid, and vinyl esters of $C_2$ to $C_{24}$ alkylcarboxylic acids, at least 60 percent by weight of said monomers (b) being selected from the group consisting of $C_1$ to $C_3$ alkyl esters of acrylic acid and methacrylic acid, and mixtures of said esters with styrene, acrylonitrile and both styrene and acrylonitrile, said esters constituting at least 50 percent by weight of said mixtures, in the presence of a solution of (B) a copolymer of monomers of group (a) and group (b), at least 60 percent by weight of said monomers (b) being selected from the group consisting of $C_4$ to $C_{12}$ alkyl esters of acrylic acid and methacrylic acid, in (c) an organic liquid selected from the group consisting of aliphatic hydrocarbons, cycloaliphatic hydrocarbons and aromatic hydrocarbons, aliphatic ketones, ethers and esters respectively having up to 12 carbon atoms and mixtures of these solvents, in which the copolymer (A) is insoluble; and
  II. an isocyanate selected from the group consisting of divalent and trivalent isocyanates of the paraffin series having two to 18 carbon atoms, toluylene diisocyanate and triisocyanate, diphenylmethane-4,4'-diisocyanate, and diphenylpropane- (2,2')- 4,4'-diisocyanate.

2. A crosslinkable coating agent as claimed in claim 1 having the following contents of comonomers (a) and (b) in the dispersion (I):
  comonomer (a): 2 to 40 percent by weight,
  comonomer (b): 98 to 60 percent by weight, each with reference to (A) and
  comonomer (a): 2 to 50 percent by weight
  comonomer (b): 98 to 50 percent by weight, each with reference to (B),
and wherein said isocyanate constitutes 2–30 percent by weight with reference to the solids content of the dispersion (I).

3. A crosslinkable coating agent as claimed in claim 1 having the following contents of comonomers (a) and (b) in the dispersion (I):
  comonomer (a): 2 to 40 percent by weight,
  comonomer (b): 98 to 60 percent by weight, each with reference to (A) and
  comonomer (a): 2 to 50 percent by weight
  comonomer (b): 98 to 50 percent by weight, each with reference to (B).

4. A crosslinkable coating agent as claimed in claim 1 having the following contents of comonomers (a) and (b) in the dispersion (I):
  comonomer (a): 5 to 35 percent by weight
  comonomer (b): 95 to 75 percent by weight in each case with reference to (A) and
  comonomer (a): 5 to 30 percent by weight
  comonomer (b): 95 to 70 percent by weight, each with reference to (B).

5. A crosslinkable coating agent as claimed in claim 1 wherein the dispersion (I) contains 3 to 100 percent by weight of copolymer (B) with reference to the copolymer (A).

6. A crosslinkable coating agent as claimed in claim 1 wherein the dispersion (I) contains 5 to 30 percent of copolymer (B) with reference to the copolymer (A)

7. A crosslinkable coating agent as claimed in claim 1 wherein 2 to 30 percent by weight of said isocyanate (II) is used with reference to the solids content of the dispersion (I).

8. A crosslinkable coating agent as claimed in claim 2 wherein 5 to 12 percent by weight of said isocyanate (II) is used with reference to the solids content of the dispersion (I).

9. A crosslinkable coating agent as claimed in claim 3 wherein said comonomer (a) is a partial ester of acrylic acid, methacrylic acid or maleic acid with a polyhydric saturated, aliphatic, alcohol containing two to eight carbon atoms.

10. A crosslinkable coating agent as claimed in claim 3 wherein said comonomer (a) is butanediol monoacrylate.

11. A crosslinkable coating agent as claimed in claim 3 wherein said comonomer (a) is propanediol monoacrylate.

12. A crosslinkable coating agent as claimed in claim 3 wherein said comonomer (a) is ethylene glycol monoacrylate.

13. A crosslinkable coating agent as claimed in claim 3 wherein said comonomer (a) is a mixture of butanediol monoacrylate and N-methylol methacrylamide.

14. A process for using a crosslinkable coating agent as claimed in claim 1 for resin finishing textile material, paper or leather, for coating wood, glass, ceramics and concrete, or as a binder for the production of bonded nonwoven fabrics and laminated articles, which comprises applying said coating agent to one of said materials and heating to about 60° to 160° C in order to vaporize the organic solvent and crosslink the coating agent.

15. A crosslinkable coating agent as claimed in claim 3 wherein copolymer (A) has a K-value in the range of 30 to 100 and copolymer (B) has a K-value in the range of 15–30.

16. A crosslinkable coating agent as claimed in claim 2 wherein copolymer (A) has a K-value in the range of 30 to 100 and copolymer (B) has a K-value in the range of 15–30.

* * * * *

UNITED STATES PATENT OFFICE
CERTIFICATE OF CORRECTION

Patent No. 3,721,640          Dated March 20, 1973

Inventor(s) Hans Wilhelm, Klaus Gulbins, and Heinrich Hartmann

It is certified that error appears in the above-identified patent and that said Letters Patent are hereby corrected as shown below:

First page, top of the left-hand column, "Wilheim" should read -- Wilhelm --; left-hand column, second line, "Wilheim" should read -- Wilhelm --; seventh line, "Ludwigslafen" should read -- Ludwigshafen --.

Column 7, line 46, claim 1, "a' " should read --  (a')  --.

Signed and sealed this 18th day of December 1973.

(SEAL)
Attest:

EDWARD M. FLETCHER, JR.                RENE D. TEGTMEYER
Attesting Officer                      Acting Commissioner of Patents